(12) United States Patent
Nyovanie (10) Patent No.: US 12,480,858 B2
(45) Date of Patent: Nov. 25, 2025

(54) AUTOMATED VISUAL INSPECTION

(71) Applicant: AMGEN INC., Thousand Oaks, CA (US)

(72) Inventor: Prosper Munaishe Nyovanie, Thousand Oaks, CA (US)

(73) Assignee: Amgen Inc., Thousand Oaks, CA (US)

( * ) Notice: Subject to any disclaimer, the term of this patent is extended or adjusted under 35 U.S.C. 154(b) by 992 days.

(21) Appl. No.: 17/609,306

(22) PCT Filed: May 7, 2020

(86) PCT No.: PCT/US2020/031921
§ 371 (c)(1),
(2) Date: Nov. 8, 2021

(87) PCT Pub. No.: WO2020/227559
PCT Pub. Date: Nov. 12, 2020

(65) Prior Publication Data
US 2022/0221390 A1     Jul. 14, 2022

Related U.S. Application Data (60) Provisional application No. 62/845,238, filed on May 8, 2019.

(51) Int. Cl.
| | | |
|---|---|---|
| *G01N 15/02* | (2024.01) | |
| *B81B 7/02* | (2006.01) | |
| *G01N 15/0227* | (2024.01) | |
| *G01N 15/06* | (2024.01) | |
| *G01N 15/00* | (2006.01) | |
| *G01N 15/075* | (2024.01) | |

(52) U.S. Cl.
CPC .......... *G01N 15/0227* (2013.01); *B81B 7/02* (2013.01); *G01N 15/06* (2013.01); *G01N 2015/0053* (2013.01); *G01N 15/075* (2024.01)

(58) Field of Classification Search
CPC .. G01N 15/0227; G01N 15/06; G01N 15/075; G01N 2015/0053; B81B 7/02
See application file for complete search history.

(56) References Cited

U.S. PATENT DOCUMENTS

| | | | |
|---|---|---|---|
| 2014/0177932 A1* | 6/2014 | Milne | G01N 15/1433 |
| | | | 382/128 |
| 2017/0003285 A1 | 1/2017 | Sundvor | |
| 2017/0056603 A1 | 3/2017 | Cowan | |
| 2018/0038887 A1* | 2/2018 | Zhang | G01P 15/125 |

FOREIGN PATENT DOCUMENTS

| | | |
|---|---|---|
| EP | 1438562 B1 | 6/2007 |
| WO | 2013033253 W | 3/2013 |

OTHER PUBLICATIONS

PCT/US2020/031921 International Preliminary Report on Patentability dated Nov. 2, 2021.

\* cited by examiner

*Primary Examiner* — Jamil Ahmed
(74) *Attorney, Agent, or Firm* — Scott Siera (57) ABSTRACT

Some embodiments include a syringe plunger comprising one or more surface features, wherein the one or more surface features are configured for enhanced detection of particles in the syringe. Some embodiments include a sensor for monitoring the stress on a product. Some embodiments include a method of monitoring the stress profile of a product.

6 Claims, 12 Drawing Sheets

Spin    Stop    Inspect    Inspect    Liquid Level / Particles

AUTOMATED VISUAL INSPECTION

CROSS REFERENCE TO RELATED APPLICATIONS

This application claims the benefit of U.S. patent application Ser. No. 62/845,238 filed May 8, 2019, which is incorporated herein by reference in its entirety.

FIELD

Some embodiments herein relate to methods and apparatuses for automated visual inspection of particles in medicines.

BACKGROUND

Particles in parenteral drugs can cause negative patient outcomes. Currently, manual visual inspection is the gold standard for the required visual inspection of particulate matter in parenteral medicines. Automated visual inspection machines offer an opportunity to improve efficiency, rate and consistency. However, it is critical that automated visual inspection machines detect the presence of particles before they reach patients. In addition, product impact analysis is an important step during the qualification of equipment before it can be used in the manufacturing processes of pharmaceuticals. Product impact analysis confirms that the equipment is not damaging the product during production. The implementation of automated visual inspection poses challenges. For instance, improved solutions to low detection rates of dense particles in products, and misuse of automated inspection machines for product impact testing are required.

SUMMARY

Described herein are techniques used to detect particles using automated visual inspection machines, such as glass and metal in parenteral drugs. Described herein are also solutions to reduce false accepts during the inspection process.

In some embodiments, a syringe plunger is described. The syringe plunger may comprise one or more surface features, in which the one or more surface features improve or enhance detection of particles in the syringe. The enhanced detection of particles may comprise at least an 80%, 85%, or 89% success rate of suspending the particles in a solution in the syringe upon rotating the syringe and abruptly stopping the rotation. The enhanced (or improved) detection of particles may be measured as a greater lifting of particles having a diameter of about 400 microns and a density of 2.4-2.6 g/cm$^3$ in a solution having a viscosity of about 9.2 cP when spun at about 3500 and then stopped abruptly, as compared to a syringe plunger that does not comprise the one or more surface features. By way of example, the plunger may comprise 1, 2, 3, 4, or 5 surface features, including ranges between any two of the listed values, for example, 1-2, 1-3, 1-4, 1-5, 2-3, 2-4, 2-5, 3-4, 3-5, or 4-5 surface features. By way of example, the plunger may comprise at least 1, 2, 3, 4, 5, 6, 7, 8, 9, or 10 surface features, including ranges between any two of the listed values, for example 1-10, 3-7, 3-10, 5-7, or 5-10 surface features. The one or more plunger surface features may be up to 250, 500, 750, 1000, or 1250 micrometers in height, including ranges between any two of the listed values, for example, 250-500 micrometers, 250-750 micrometers, 250-1000 micrometers, 250-1250 micrometers, 500-750 micrometers, 500-1000 micrometers, 500-1250 micrometers, 750-1000 micrometers, 750-1250 micrometers, or 1000-1250 micrometers in height. For example, the one or more plunger surface features may be 250, 500, 750, 1000, or 1250 micrometers in height. The one or more surface features may comprise a half cylinder or wedge profile. In some embodiments, the plunger comprises five surface features, and the surface features comprise a half cylinder profile and are 500 micrometers in height. In some embodiments, the plunger comprises five surface features, and the surface features comprise a half cylinder profile and are 250-750 micrometers in height.

Also described herein is a method of detecting a particle in a syringe, comprising utilizing any of the plungers described herein during an automated visual inspection process.

Also provided herein is a sensor for monitoring the stress on a product, wherein the sensor is embedded into a housing for a container and comprises a micro-electro-mechanical system (MEMS). In some embodiments, the MEMS is an accelerometer. In certain embodiments, the MEMS measures rotational and translational accelerations in all three dimensions. In other embodiments, the container is a container for a protein. In some embodiments, the container is a vial or syringe. In other embodiments, the protein is an antibody or an antibody fragment. The invention also provides a method of monitoring the stress profile of a product, comprising utilizing any of the sensors described herein during an automated visual inspection process. In certain embodiments, the stress profile comprises the acceleration or velocity of the product.

BRIEF DESCRIPTION OF THE DRAWINGS

FIGS. 7A-B are images of plungers.

DETAILED DESCRIPTION

Described in accordance with some embodiments herein are syringe plungers comprising surface features that enhance detection of particles in the syringe. It is observed herein that surface features as described herein yield superior suspension of particles when syringes are subjected to rotational forces. Accordingly, the surface features can permit a superior success rate in suspending, and therefore detecting the particles in the syringe, compared to a syringe plunger that does not comprise the surface features.

Particle Detection in Automated Visual Inspection Machines

Automated visual inspection machines utilize a combination of hardware and software to detect particles. Static Division (SD) sensor and video cameras are the popular hardware sensors used to detect particles. Static Division (SD) sensors detect the change in light intensity caused by shadow particles as they move around in solution. Video cameras on the other hand mostly use image processing software to detect particles in solution. In both Static Division and video cameras, the motion of particles in solution helps the automated visual inspection machine differentiate between particles in the product and those on the outside of the container. Particles on the outside of the container do not affect the product quality and so are not rejects.

Figure 1:
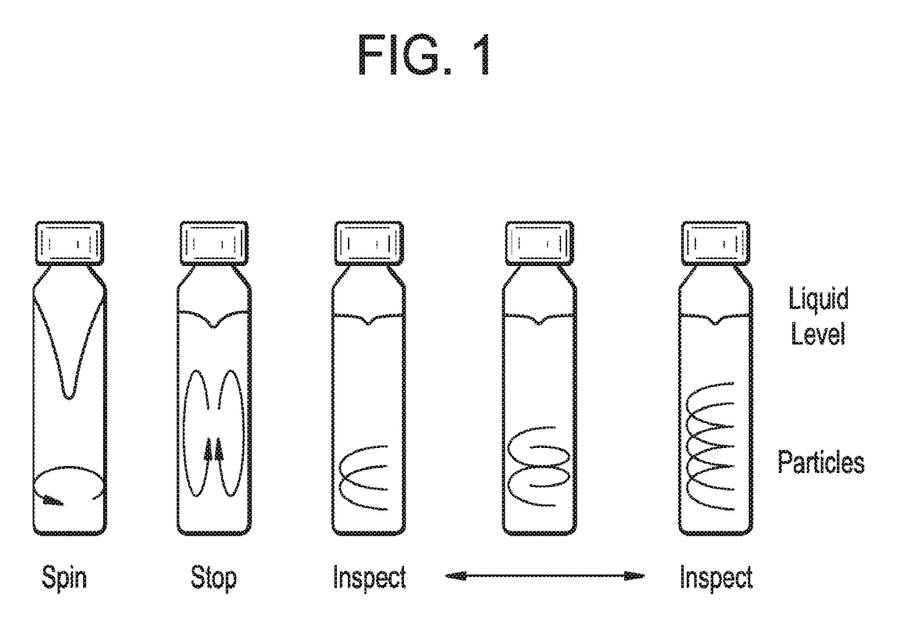
FIG. 1 is a schematic diagram of a visual inspection machine spin and stop sequence to detect particles

Automated visual inspection machines try to get particles into solution to improve their detection. The machines usually rely on spinning the product at a high rotational speed, abruptly stopping the rotation and then inspecting for particles. This process in shown in FIG. 1. When the product is spun at a high rotational speed, usually above 1,500 rpm, a vortex is created in the liquid. The liquid surface in the rotating product forms a parabola whose shape depends on the rotational speed of the container. When the rotating container is stopped suddenly, the parabolic shape of the liquid collapses, creating eddy fluid flow within the container. This flow causes particles to move around in the product. The motion of particles in solution, as mentioned earlier, helps with distinguishing between particles in product from those on the outside of the container.

Unfortunately, dense particles like glass and metal, are harder to get into solution, and tend to stay at the bottom on the containers where they are harder to detect. Since the lift force generated by the spin and sudden stop process increases with higher spin speeds, higher rotational speeds are needed to get dense particles into solution where they can be detected. However, there is a limit to the rotational speed that can be used in automated inspection machines. The increased mechanical stresses caused by very high rotation speeds may also cause proteins in the drugs to be damaged, rendering the medicine ineffective or causing negative patient outcomes.

Plunger Surfaces that Enhance Particle Detection

As discussed herein, getting dense particles into solution where they can be detected is difficult with conventional methodologies, because of the potential damage to protein molecules from high rotational speeds. Described herein are modified plunger surfaces that are configured to enhance particle detection, for example dense particle detection. As used herein, "enhanced particle detection" (which may also be referred to as "improved particle detection") has its customary and ordinary meaning as would be understood by one of ordinary skill in the art in view of this disclosure, as do variations of this root term. It refers to achieving greater suspension of particles in solution compared to a suitable baseline or control, such as an unmodified plunger surface (e.g., a flat or conical plunger surface that does not comprise any surface features. It will be appreciated that greater suspension of particles in solution permits more extensive detection of the particles in the solution. By way of example, enhanced particle detection refers to successful suspension of particles in a pharmaceutical product upon spinning the solution and then abruptly stopping the spinning. For example, a solution having attributes of a typical pharmaceutical product, such as a viscosity of about 9.2 cP, and a density of about 1.043 g/cm$^3$ may comprise particles having a density greater than the solution, for example, glass spheres having a diameter of about 400 microns and a density of 2.4-2.6 g/cm$^3$. The solution and particles may be spun at about 3500 revolutions per minute and then stopped abruptly. Statistically significantly greater lifting of the particles over the plunger comprising surface features (compared to a suitable baseline or control, such as a plunger that does not comprise surface features) can indicate enhanced particle detection, as the particles will be distributed more extensively throughout the solution. If numerical examples are of interest, enhanced particle detection may refer to at least about an 80% success rate, such as at least about 80%, 85%, 89%, 90%, 95%, or 97% success rate of suspending the particles in solution. For example, enhanced detection of particles can comprise at least an 80% success rate of suspending the particles in a solution in the syringe upon rotating the syringe and abruptly stopping the rotation. For example, enhanced detection of particles can comprise at least an 85% success rate of suspending the particles in a solution in the syringe upon rotating the syringe and abruptly stopping the rotation. For example, enhanced detection of particles can comprise at least an 89% success rate of suspending the particles in a solution in the syringe upon rotating the syringe and abruptly stopping the rotation. As such, a syringe plunger described herein may comprise surface features configured for greater lifting of particles having a diameter of about 400 microns and a density of 2.4-2.6 g/cm$^3$ in a solution having a viscosity of about 9.2 cP when spun at about 3500 and then stopped abruptly, as compared to a syringe plunger that does not comprise the one or more surface features.

A plunger surface of embodiments herein can comprise one or more surface features as described herein, for example at least 1, 2, 3, 4, 5, 6, 7, 8, 9, or 10 surface features, including ranges between any two of the listed values, for example 1-2, 1-3, 1-4, 1-5, 1-6, 1-7, 1-8, 1-9, 1-10, 2-3, 2-4, 2-5, 2-6, 2-7, 2-8, 2-9, 2-10, 3-4, 3-5, 3-6, 3-7, 3-8, 3-9, 3-10, 4-5, 4-6, 4-7, 4-8, 4-9, 4-10, 5-6, 5-7, 5-8, 5-9, 5-10, 6-10, 7-10, 8-10, or 9-10. Modified plunger surfaces can increase the turbulent flow in spinning drug product. The turbulent flow caused by the features on the plunger will lift dense particles into solution where they can be more readily detected by automated visual inspection machines.

Figure 2A:
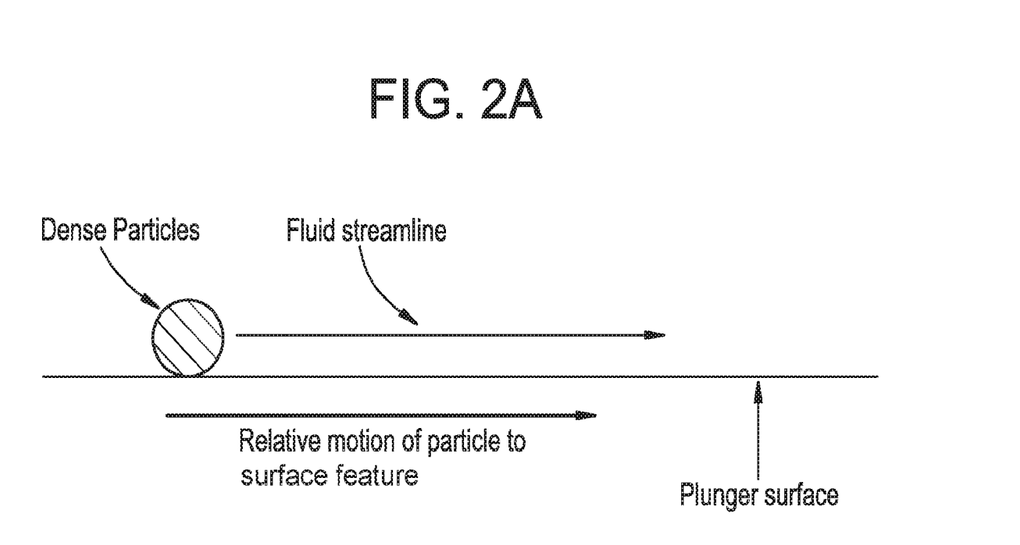
FIGS. 2A-C are a series of schematic diagrams showing fluid streamlines under different surface features.
Figure 2B:
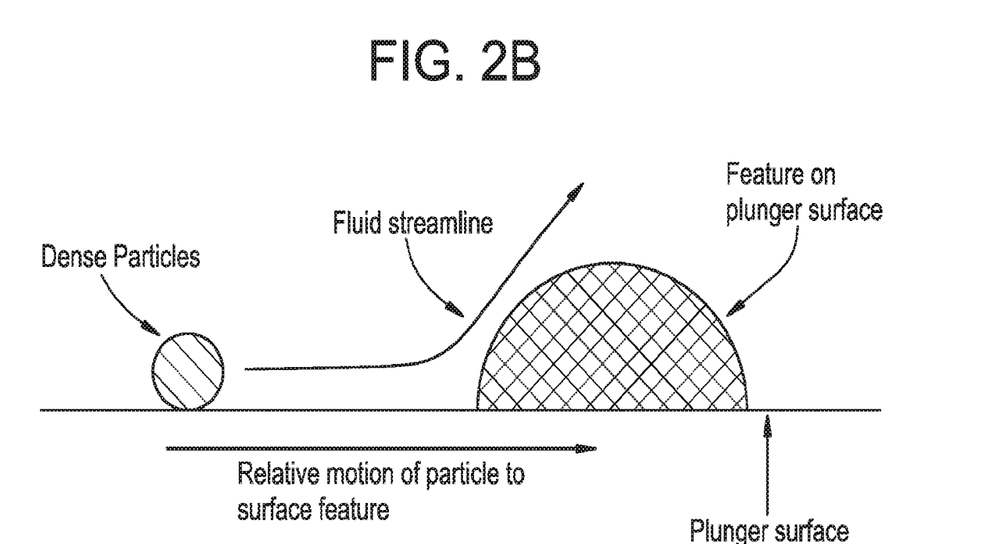
Figure 2C:
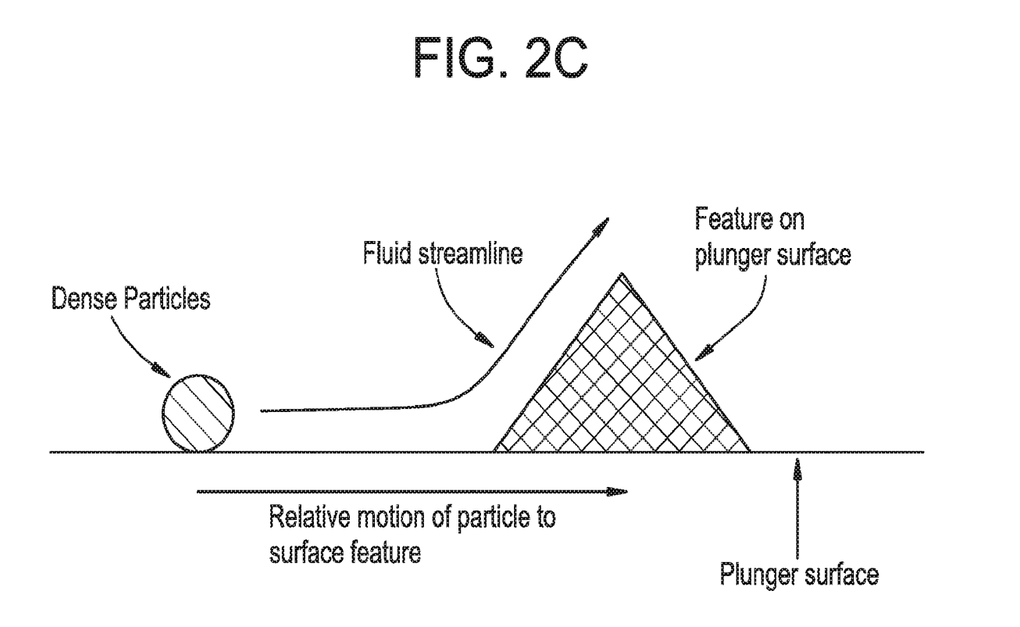

As used herein, "surface feature" has its customary and ordinary meaning as would be understood by one of ordinary skill in the art in view of this disclosure. It refers to an elevation above a surface, for example a half-cylinder elevation or a wedge-shaped elevation. The wedge-shape may have about a 45-degree angle of attack, for example, 35-55 degrees or 40-50 degrees. The surface feature may be integral to the plunger. Alternatively, the surface feature may be separate from the plunger, such as a surface feature that is adhered to the plunger. The surface feature may have a micrometer-scale height. For example, the surface feature may have a height of up to 250, 500, 750, 1000, or 1250 micrometers, including ranges between any two of the listed values, such as 250-500 micrometers, 250-750 micrometers, 250-1000 micrometers, 250-1250 micrometers, 500-750 micrometers, 500-1000 micrometers, 500-1250 micrometers, 750-1000 micrometers, 750-1250 micrometers, or 1000-1250 micrometers. For example, the surface feature may have a height of about 250, 500, 750, 1000, or 1250 micrometers. FIGS. 2A-C illustrate examples of how surface features as described herein can create a fluid streamline that lift the particles into solution. Without being limited by theory, introducing surface features may alter the fluid streamlines close to the plunger surface, lifting particles into solution.

There are a number of potential benefits to automated visual inspection. Firstly, dense particles moving around in solution can be more easily detected by current automated particle detection techniques than if they were at the bottom of containers. Secondly, the dense particles moving in solution can be differentiated from stationery non-contaminant particles on the outside surface of the product container. Thirdly, the rotational speed that is needed for reliable inspection of particles in drugs can be reduced. Lower rotational speeds have two benefits—reduced risk of damaging proteins from high elongational stresses and decreased wear on automated inspection machines' mechanical components.

Sensors

Described in accordance with embodiments herein are sensors for monitoring the stress on a product. A sensor may be embedded in a housing for a container. The sensor may comprise a micro-electro-mechanical system (MEMS) configured for measuring stress. For example, the sensor may be configured to measure pressure, tilt, and/or spin. One MEMS, or two or more different MEMS may be embedded in the housing. The container may be a container for a pharmaceutical product (e.g., a drug container), such as a vial or a syringe. Example pharmaceutical products include a protein, for example a therapeutic protein such as an antibody or antibody fragment. The housing for the container may have exterior dimensions that conform to, or are the same or substantially the same as a container for a pharmaceutical product that undergoes automated visual inspection. As such, the sensor may be shaped like the container for the pharmaceutical product, and passed through automated visual inspection machines in the same way as pharmaceutical products are, so as to allow measuring the full mechanical history of the product as it passes through the system.

By way of example, the MEMS may comprise, consist essentially of, or consist of an accelerometer. The sensor may be configured to measure rotational and translational accelerations in all three dimensions.

Figure 8A:
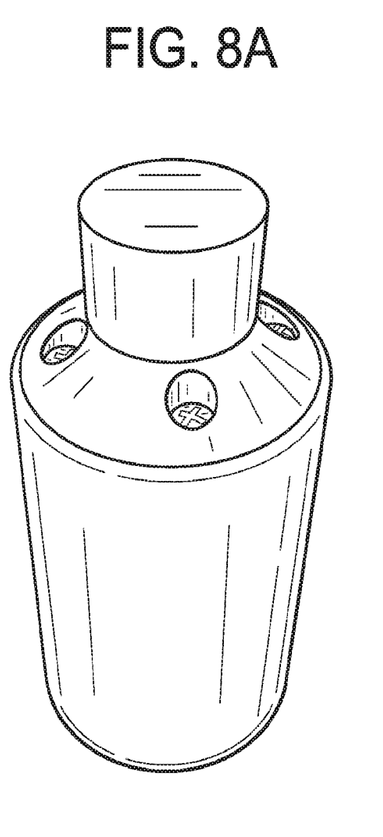
FIGS. 8A-B show images of vials. An embedded sensor is shown in FIG. 8A. A glass vial is shown in FIG. 8B. The embedded sensor of FIG. 8A is the same shape as the glass vial of FIG. 8B.
Figure 8B:
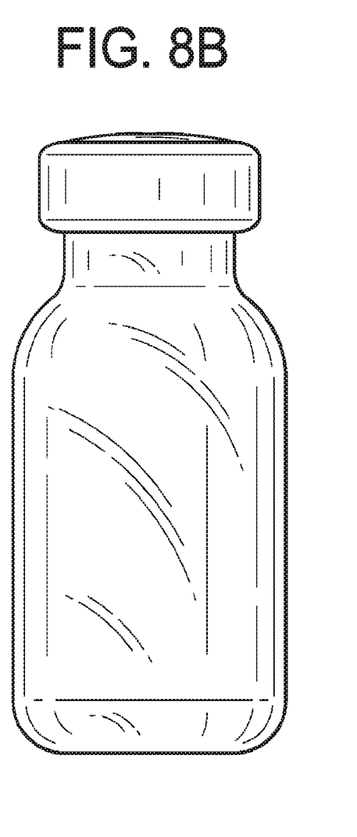

An example sensor of some embodiments herein is shown in FIG. 8A. The sensor of FIG. 8A is embedded in a container that has approximately the same exterior dimensions as a vial suitable for containing a drug product (FIG. 8B). As such the sensor may replace the vial while passing through an automated inspection machine. The sensor of FIG. 8A may contain multiple different sensors.

Product Impact Analysis

Proteins have large and complicated molecular structures that can be damaged by light intensity, elevated temperatures, mechanical shock and exposure to air-water interfaces, causing particles or protein aggregation to occur. The resulting protein aggregation can cause negative outcomes, including triggering an immune response in patients. Automated visual machines expose drug products to light, temperature increases and mechanical stresses. The accurate control of the level of stress that automated visual machines place on products is important to ensure products are not damaged and inspection performance is maintained.

Mechanical stresses can agitate particles into solution where they can be more easily detected. Unfortunately, high mechanical stresses can damage the product. The fine tuning of hardware and software settings for automated visual inspection machines is a fine balance between improving detection efficiency and not degrading the product during inspection.

Light exposure of products is well understood and can be measured using cameras already in the automated visual inspection machines or through compact light sensors. Also, temperature increase can be easily measured using infrared sensors that detect the temperature of products as they come out of automated visual inspection machines. However, measuring the full mechanical stress history of the product as it passes through an automated inspection machine is more challenging.

Because light exposure and temperature increase can be accurately measured for the automated inspection machines, tests for acceptable levels of these parameters can be conducted independent of the machine. This means that experiments can be conducted separate from the machine and guidelines can be developed for what the acceptable levels of light exposure and temperature elevation are. Technicians fine tuning machine settings that affect the temperature and light exposure of the automated visual inspection machines can more quickly come to the right value. Since the mechanical stress history of the product as it passes through the machine is unknown, technicians conventionally have had to fine tune these settings using trial and error.

Described in accordance with some embodiments herein is a measurement system for understanding the mechanical stress history of a product as it passes through multiple defect detection stations in an automated visual inspection machine. Once the mechanical history for a particular machine has been understood, an offline robotic system could be created to test the product impact analysis of the machine on specific products without disrupting the use of the machine intended for production purposes.

Figure 4:
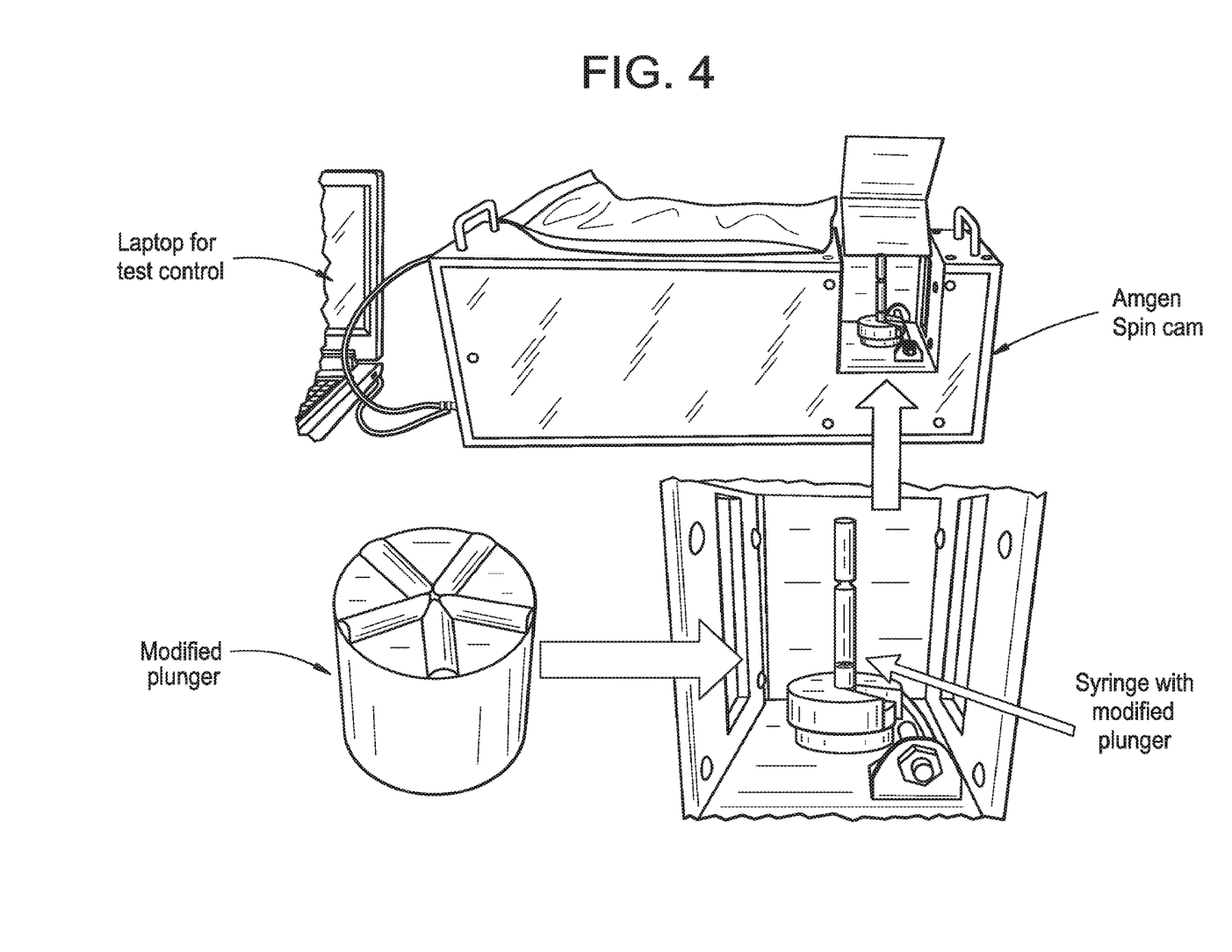
FIG. 4 is an image of an experimental set up, showing plunger surface, syringe and SpinCam.

Plungers and/or sensors as described herein may be utilized in an automated visual inspection process. The optical visual process may comprise applying rotational force to the sensor and/or plunger (for example, as part of a syringe comprising the plunger), for example by spinning the plunger and/or sensor. The sensor and/or plunger may be rotated at a rate of at least about 200, 1000, 1300, 2000, 2500, 3000, 3500, 4000, 4500, or 5000 revolutions per minute (RPM), including ranges between any two of the listed values, for example 200-2000, 200-3000, 200-4000, 200-5000, 1000-2000, 1000-3000, 1000-4000, 1000-5000, 2000-3000, 2000-4000, 2000-5000, 3000-4000, 3000-5000, or 4000-5000 RPM. The plungers and/or syringes may be rotated for a period of time (for example, at least 1, 2, 3, 4, 5, 6, 7, 8, 9, or 10 seconds, including ranges between any two of the listed values), and then abruptly stopped. Optical measurements such as pictures may then be obtained from the plunger (for example, as part of the syringe comprising the plunger) and/or sensor. The optical measurements may indicate a presence, absence, quantity, density, and/or distribution of particles in the syringe and/or sensor. By way of example, pixel counts may be used to ascertain the relative positions of particles in one, two, or three dimensions. An example setup for an automated visual inspection process is shown in FIG. 4.

Additional Options

In addition to the other items disclose herein, the following options are described:

1. A syringe plunger comprising one or more surface features, wherein the one or more surface features improve detection of particles in the syringe.
2. The plunger of option 1, wherein the plunger comprises 1, 2, 3, 4, or 5 surface features.

3. The plunger of options 1 or 2, wherein the one or more surface features comprise a half cylinder or wedge profile.
4. The plunger of any one of options 1-3, wherein the one or more plunger surface features are 250, 500, 750, 1000, or 1250 micrometers in height.
5. The plunger of option 1, wherein the plunger comprises five surface features, wherein the surface features comprise a half cylinder profile and are 500 micrometers in height.
6. A method of detecting a particle in a syringe, comprising utilizing the plunger of any one of options 1-5 during an automated visual inspection process.
7. A sensor for monitoring the stress on a product, wherein the sensor is embedded into a housing for a container and comprises a micro-electro-mechanical system (MEMS).
8. The sensor of option 7, wherein the MEMS is an accelerometer.
9. The sensor of option 7 or 8, wherein the MEMS measures rotational and translational accelerations in all three dimensions.
10. The sensor of option 7, wherein the container is a container for a protein.
11. The sensor of option 10, wherein the container is a vial or syringe.
12. The sensor of option 10, wherein the protein is an antibody or an antibody fragment.
13. A method of monitoring the stress profile of a product, comprising utilizing the sensor of any one of options 7-12 during an automated visual inspection process.
14. The method of option 13, wherein the stress profile comprises the acceleration or velocity of the product.

Example 1: Modified Plunger Surfaces Improve Particle Detection

Experiments were conducted using syringes. Syringes were chosen for this experiment over vials, because it was easier to modify the surface of plungers in syringes compared to altering the bottom of vials. A standard 1 ml syringe made of Crystal Zenith™ was chosen for the experiment, because Crystal Zenith™ is clear and more breakage resistant than glass syringes.

Protein based parenteral drugs are sensitive to ambient conditions and have to be maintained within a controlled environment. This poses a challenge when conducting experiments as the product can easily degrade while performing tests. A mimic solution was used for the experiments. The mimic solution shares similar physical attributes to a typical pharmaceutical product, like viscosity and surface tension, but is more stable in standard room conditions than the drug. This means that mimic solutions can be used to replicate the physical behavior of the product during experiments. The mimic solution used for experiments had a viscosity of 9.2 cP, density of 1.043 g/cm$^3$ and surface tension of 51.69 mN/m.

The plungers for the syringes were fabricated using a Form 2 stereolithography (SLA) 3-D printer, with 50-micron layer thickness (axis resolution) and 140-micron laser spot size [24]. Formlabs Flexible resin was used as the material, because its flexibility formed a good seal while still being hard enough to retain its shape during testing. Plungers with different diameters were printed to find the right fit that allowed easy insertion into the syringe and ensuring that it was an integral unit.

Glass spheres were chosen to be the particles in the experiments. The glass spheres had a density of 2.4-2.6 g/cm$^3$, about 2.3-2.5 times denser than the mimic solution. The particles had a diameter of 400 microns (22-micron standard deviation and 5.5% coefficient of variation) and were clearly visible to the naked eye. The density and size of the glass spheres make them difficult to suspend into solution. The glass spheres represented one of the more challenging particles for automated visual inspection machines to detect.

The first step to performing the experiment was the assembly of the syringe and plungers. Original plungers were used as the control to test the efficacy of the modified plungers. The assembly process had to replicate the conditions that were in a typical 1 ml syringe product. 1 ml of mimic solution was carefully measured and introduced into clean syringes. Great care was taken to avoid the creation of bubbles that could look similar to the glass spheres during the testing. After the mimic solution was added to the syringe, one glass sphere was added to each syringe.

Figure 3A:
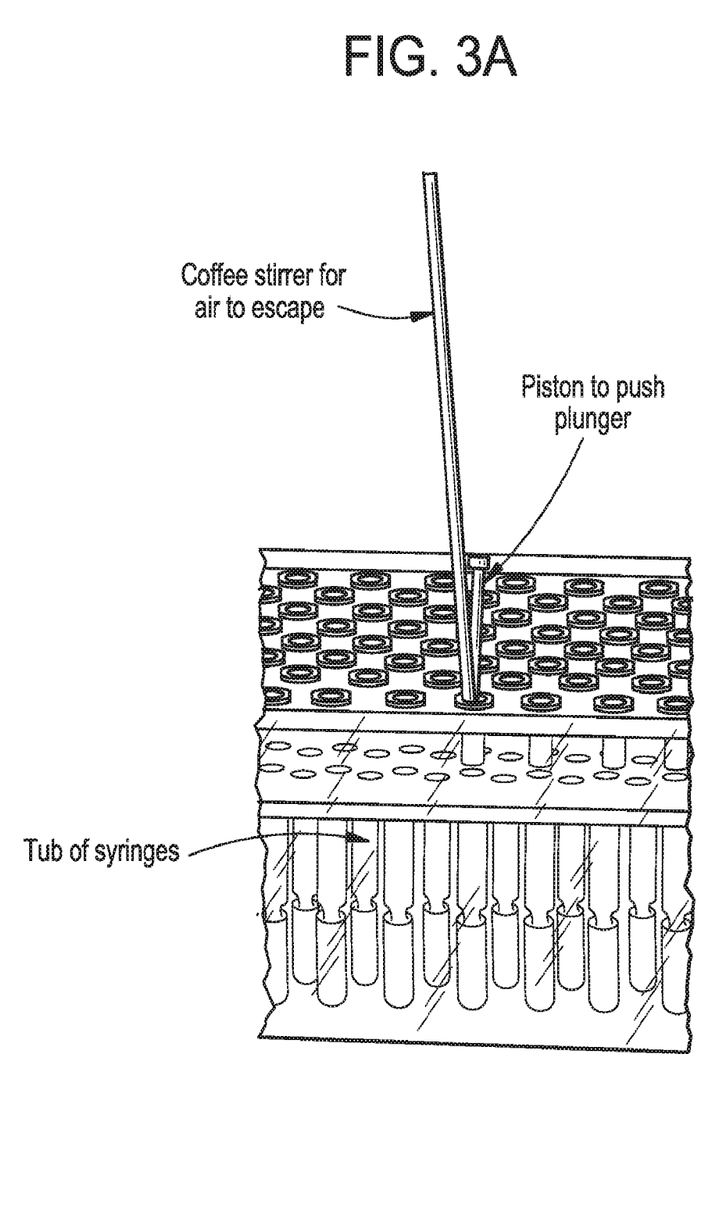
FIGS. 3A-B are a series of images of a syringe sample assembly process.
Figure 3B:
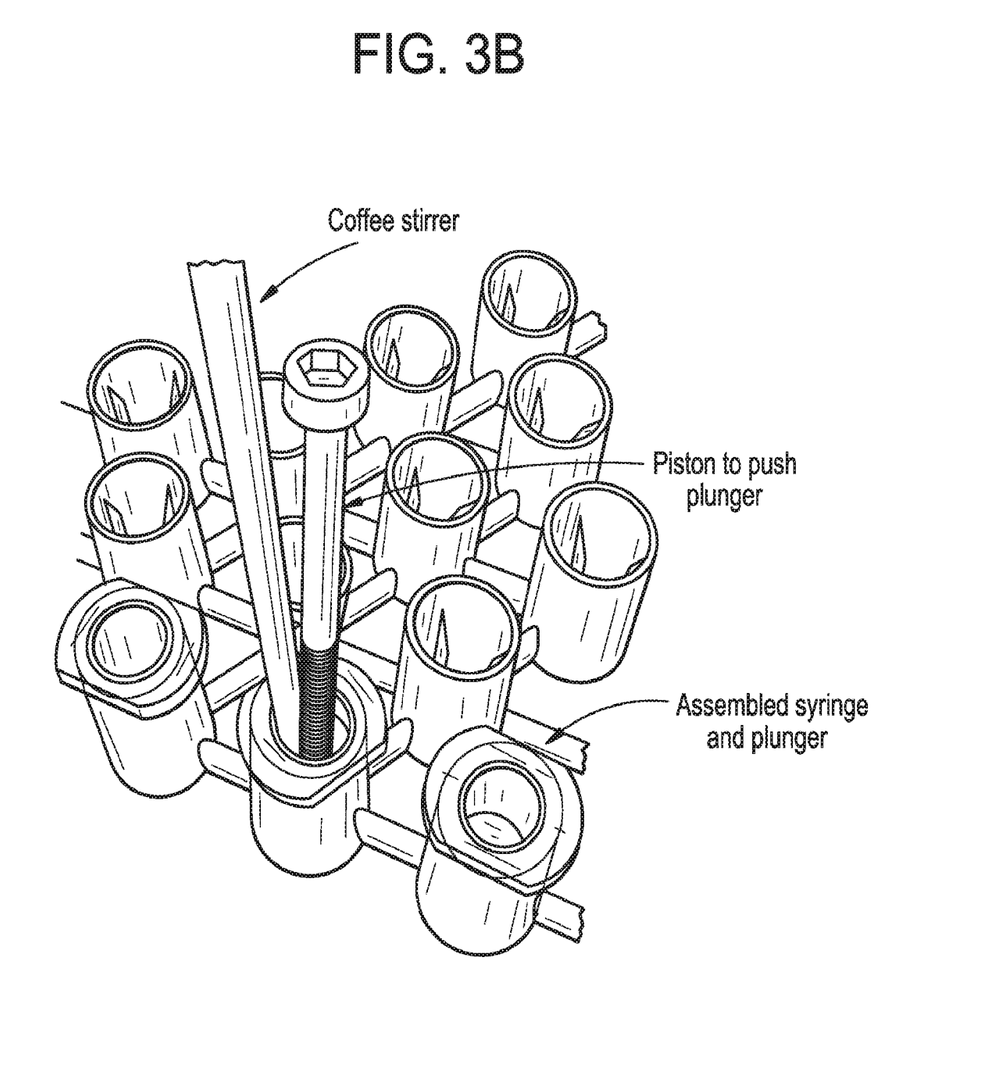

Pressure inside the syringe after assembly of the syringe and plunger is another variable that could affect the results of the experiments. Air compressed during the assembly process can push back the plunger resulting in a bigger air pocket in the experimental sample than would be expected in commercial product. FIGS. 3A-B show the assembly process of the syringes and plungers. The coffee stirrer acts as a flexible hollow tube that allows air to escape while the plunger is being pushed into the syringe by the piston. The plunger depth into the syringe stayed at the same level as that of commercially produced 1 ml syringes of the product.

Assembly process of syringe and plunger is in FIG. 3. The picture on the left shows the zoomed in version of the picture on the right. The coffee stirrer allows air to escape while the plunger is pushed into the syringe.

A SpinCam was used as the test setup. The SpinCam consists of a camera to take pictures of the product, an electric motor to spin the product and red LED lights to provide illumination for the experiment. The setup is designed to replicate conditions in an automated visual inspection machine. FIG. 4 shows the setup. The spin characteristics, acceleration, rotational speed and duration of spin are all controlled via software on a laptop that connects to the SpinCam. 3,500 revolutions per minute was used for all the experiments. The syringes were rotated for three seconds before being abruptly stopped. Pictures were taken while the syringes were spinning and for a second after the spinning stops. The exposure of the camera allowed for glass particles to be observed as white streaks as they move through solution.

After the experiments, the acquired images were analyzed using ImageJ software from the U.S. National Institutes of Health (NIH) image processing software [25]. ImageJ was used to count the number of pixels between the top of the plunger surface to the midpoint of the white streak of the glass particles. The pixel count was converted into length units by measuring features of a known height as a reference. One pixel corresponded to 20.7 µm±0.6 µm.

Original plungers were used as controls for the experiments. The surface of the plungers was modified to see how surface features affected the agitation of dense particles—glass spheres in these experiments—into solution. The plunger surface features were all ribs that varied in shape, number of features and size of features. Two different shapes were used in the experiments, half cylinder and wedge profiles as shown in FIG. 2. The features stretched from the edge of the plunger to the middle of the plunger. The wedge and half cylinder profiles are chosen because of their symmetry. This allows them to have the same effect regardless of the direction of spin of the product. Profiles with steeper angles of attack were not chosen because of the risk of causing cavitation and bubbles that could damage proteins.

Changing the size of the features was also tested. Only half cylinder profiles were used. The feature sizes were varied from 250 microns to 1,250 microns in increments of 250 microns. This meant there were five different sizes of the half cylinder profiles.

Figure 5A:
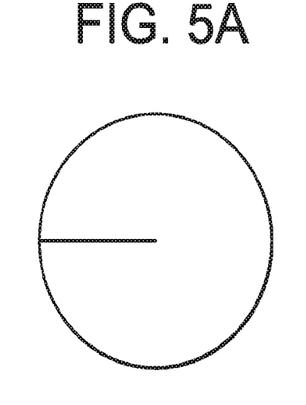
FIGS. 5A-C are schematic diagrams of one-feature (FIG. 5A), two-feature (FIG. 5B), and five-feature (FIG. 5C) arrangements on a plunger surface
Figure 5B:
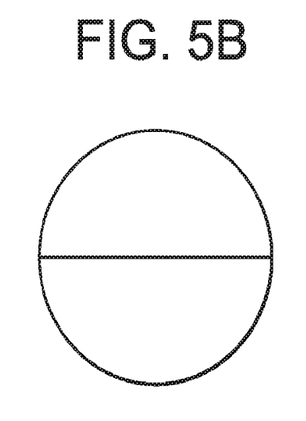
Figure 5C:
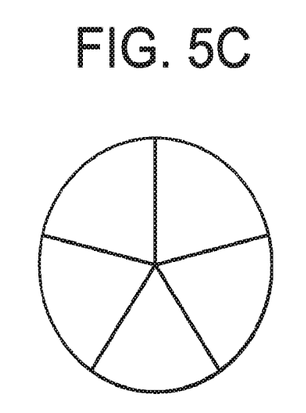
Figure 6:
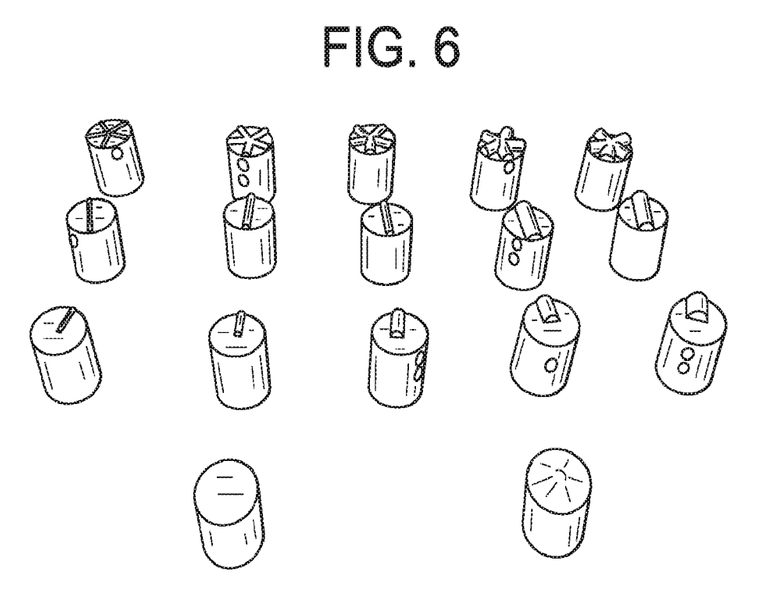
FIG. 6 is an image of plungers with modified surfaces according to some embodiments. Feature size is increasing from left to right.

The number of features was also varied. Modified plungers were created with one, two and five features. This full variation was only done on half cylinder profiles. Wedge profiles only had experiments with two and five features. FIGS. 5A-C shows the arrangement of features on the surface of the plungers. FIGS. 5A-C show plunger surfaces with a varying number of features and varying heights.

The angle of attack of surface features was also tested on the wedge profile. The angles of attack tested were 30 degrees, 45 degrees and 60 degrees. The height of the features was maintained constant at 1 mm for the different angles of attack. Most of the angles of attack were only tested with two features. The 45-degree angle of attack was also tested at 500 microns and five features.

Figure 7A:
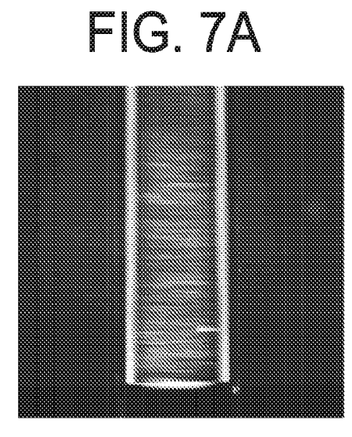
FIG. 7A shows a flat plunger.
Figure 7B:
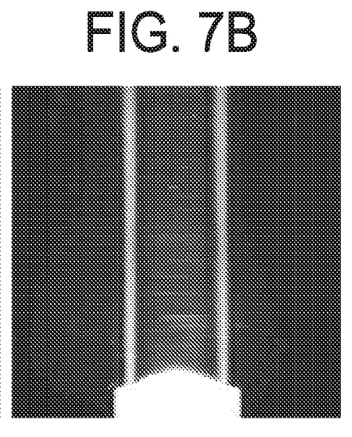
FIG. 7B shows an original plunger.

Original plunger surfaces are very smooth and have a low coefficient of friction compared to the 3-D printed plungers. A difference in agitation of particles into solution could very well be caused by the difference. To test this potential, flat plunger samples with no features were also created. This allowed for the verification that the surface features influenced the particle suspension rather than the change in surface roughness. Flat plungers did however differ from original plunger surfaces that are slightly conical in shape. FIGS. 7A-B shows a side by side comparison of the flat plunger surface (FIG. 7A) versus original plunger (FIG. 7B). The plunger of FIG. 7B is the original plunger shape. The experiments were conducted in two phases: (1) picking the best features and (2) verifying the significance of results. The best feature selection involved making one sample of each variation. Each sample was tested at least three times in the experimental setup. The effectiveness in agitating particles into solution was measured using the ImageJ software.

Half-cylinder Comprising Five Features

Although the 1250 µm and 1000 µm features showed very inconsistent suspension of the glass particles, samples with 250 µm, 500 µm and 750 µm were successful in suspending particles in all three trials. The particles were on average raised to 535 µm, 1099 µm and 651 µm by the 250 µm, 500 µm and 750 µm features, respectively. Out of the five feature samples, 500 µm was the best feature in terms of consistency and height the particles were lifted into the solution, but 250 µm and 750 µm were deemed to be successful.

Half-cylinder Comprising Two Features

In this experiment, the 250 µm and 1250 µm samples had all three trials resulting in suspension of particles. The average heights measured during those trials were 473 µm and 666 µm, for the 250 µm and 1250 µm samples respectively. The 500 µm sample was tested five times instead of the usual three times. Three of the experiments resulted in suspensions, with an average of 1122 µm. The 500 µm sample had the highest average height achieved by the glass particle in the solution. The 750 µm samples had an average particle height of 244 µm.

Half-cylinder One Feature

In this experiment, the 250 µm sample had a 100% success rate in getting particles into the solution with an average height of 507 µm. 1250 µm sample had the next best performance, with an average of 349 µm. Both 750 µm and 1000 µm samples had an average particle height of 154 µm and 161 µm, respectively.

Half-cylinder Summary

Based on these experiments, the five feature design is the best although other designs were also successful. Across the different feature number and feature height combinations, five feature and 500 µm has a 100% success rate of suspending the glass particles, and also has the highest average particles height. This combination was best in the experiments conducted.

Two Feature Wedge

Only two feature wedge-shaped units were tested during the initial phase of the experiments. All the wedges had a height of 1000 µm, but varied in angles of attack. The angles of attack tested were 30-degree, 45-degree and 60-degree. All three samples were tested four times. The 45-degree angle of attack sample was the only one with 100% successful suspension of particles. It had glass particles reach 658 µm on average. The 30-degree sample had the next best success rate with three out of four (75%) successful suspensions and an average height of 304 µm. 60-degree sample suspended particles twice (50%) and had an average particle height of 324 µm. Since the 45-degree angle of attack was the most successful among the wedge-shaped features, it was used for the next round of experiments to verify the significance of the result.

Flat Surface

The flat nature of the plunger made the glass particle visible, even without spinning. Therefore, in all four experiments, the glass particle was observable. However, the surface of the plunger also had bubbles, which could either obscure the glass particle or cause false rejects if the bubbles were categorized as particles. Only two of the experiments (50%) resulted in the glass particles lifting the surface significantly. The average maximum height in the two successful experiments was 211 µm. This height allowed glass particles to be distinguished from bubbles that would float all the way to the meniscus if they separated from the plunger surface.

Features Selected for Round Two Experiments

As discussed above, five features did better than two and one feature samples at agitating particles into solution. Also, 500 µm high features were better at suspending particles than the other feature heights. Lastly, when analyzing different angles of attack, 45-degree samples performed the best. To test the significance of these results, five feature and 500 µm high features of both the half cylinder and 45-degree wedge were used in the next round of experiments. For these experiments, seven samples each of the original plunger, half cylinder and 45-degree wedge were tested 10 times each. This mean that there were 70 data points for each of the three types of samples.

Second Round Experiment Results

The results from the 70 experiments are summarized in Table 1 below. The wedge and half-cylinder had a higher success rate at agitating particles into solution, with an 89% and 97% success rate respectively, compared to only an 11% success rate with the original plunger design. The wedge plunger had the highest average height of the particles, beating the half-cylinder by 41 µm. The difference in height between wedge and half-cylinder is insignificant, as the standard deviation of these measurements of 611 µm and 690 µm respectively, are more than 10 times the 41 µm difference. It would be safe to assume that it is the result of natural variation.

The high standard deviation of the heights of the particle is most probably due to the variation of the position of the glass ball relative to the features. One would expect that a glass particle closer to the feature would experience the greatest lift as the relative velocity between the particle and feature would be high when the glass particle hits the feature. Particles further away from the feature would be accelerated by interacting with the flat surface of the plunger first, so by the time they reach the feature the relative velocity would be lower.

Another explanation for the high variation could be attributed to vibrations in the system when the syringes are being rotated. High vibration would cause the particles to be shaken to higher heights. Vibration of the syringe however cannot be used to explain the variation in the success rates. Assuming chance of vibration to be uniformly distributed across the three types of samples, the success rates would be closer in value. The assumption of uniform distribution of vibration across tests is supported by the similar standard deviations for the wedge and half-cylinder.

TABLE 1

Results of suspension experiments

| Feature | Average Particle Height (μm) | Standard Deviation (μm) | # of Suspensions | # Failed Suspensions | % Success |
|---|---|---|---|---|---|
| Original | 79.1 | 266 | 8 | 62 | 11% |
| Wedge | 908 | 611 | 62 | 8 | 89% |
| Half-cylinder | 867 | 690 | 68 | 2 | 97% |

Getting particles into solution consistently to allow for the reliable detection of dense particles is the most important metric. The 500 μm, five feature and half-cylinder design does this the most consistently at a success rate of 97%. Therefore, it is the best surface modification that was tested during these experiments.

These experiments showed that modifications to the plunger surfaces did improve the rate that particles were successfully agitated into solution. Modified plungers are demonstrated to improve the detection rates of dense particles using automated visual inspection machines.

Example 2: Product Impact Analysis

Product embedded sensors were evaluated for mapping the mechanical stress profile of a product as it passes through an automated visual inspection machine. Embedded sensors, such as accelerometers and gyroscopes, are now small enough to be embedded into biologic size containers, like syringes and vials. Sensors embedded into housings, shaped like drug containers, can be passed through automated visual inspection machines in the same way products are. This would allow measuring the full mechanical history of the product as it passes through the system. FIGS. 8A-B show examples of an embedded sensor and a vial that it would replace while passing through an automated inspection machine. The sensor of FIG. 8A could contain multiple different sensors. This one in particular measures pressure, tilt and spin.

Embedded sensors are generally considered to be the best method for mapping out the mechanical stress history of products. The embedded sensors use Micro-Electro-Mechanical Systems (MEMS) to measure rotational and translational accelerations in all three-dimensions. MEMS linear accelerometers on the market can measure up to 500 g, which is well above the required acceleration measurement. However, MEMS gyroscopes currently available in sensor embedded drug container shapes only go up to 2000 degrees per second or 333 RPM. This is lower than the typical spinning rate of 1,500 to 3,000 RPM used in automated inspection machines.

Accelerometers are used to measure an object's acceleration. To understand how accelerometers could be used for measuring rotational velocity, a relation between acceleration and rotational velocity was used. Objects that are moving in a circle experience centripetal acceleration that is given by the following equation:

$$a_c = \omega^2 r \qquad (1)$$

Where $a_c$ is centripetal acceleration in $ms^{-2}$, $\omega$ is the angular velocity in radians per second and r is the radius of rotation in meters.

The radius of rotation in a spinning container can be assumed to be constant. This means if the radius of rotation can be determined, the rotational velocity can be calculated from the accelerometer measurements.

A sensor with similar capabilities to what would be used for measuring the mechanical stress of a product in an automated visual inspection machine was selected for the experiments. The selected Slam Stick C sensor had a ±16 g DC MEMS three axis accelerometer and a 2,000 degrees per second (333 RPM) three axis gyroscope. This sensor provides measurements in all six degrees of freedom for a rigid body.

Figure 9:
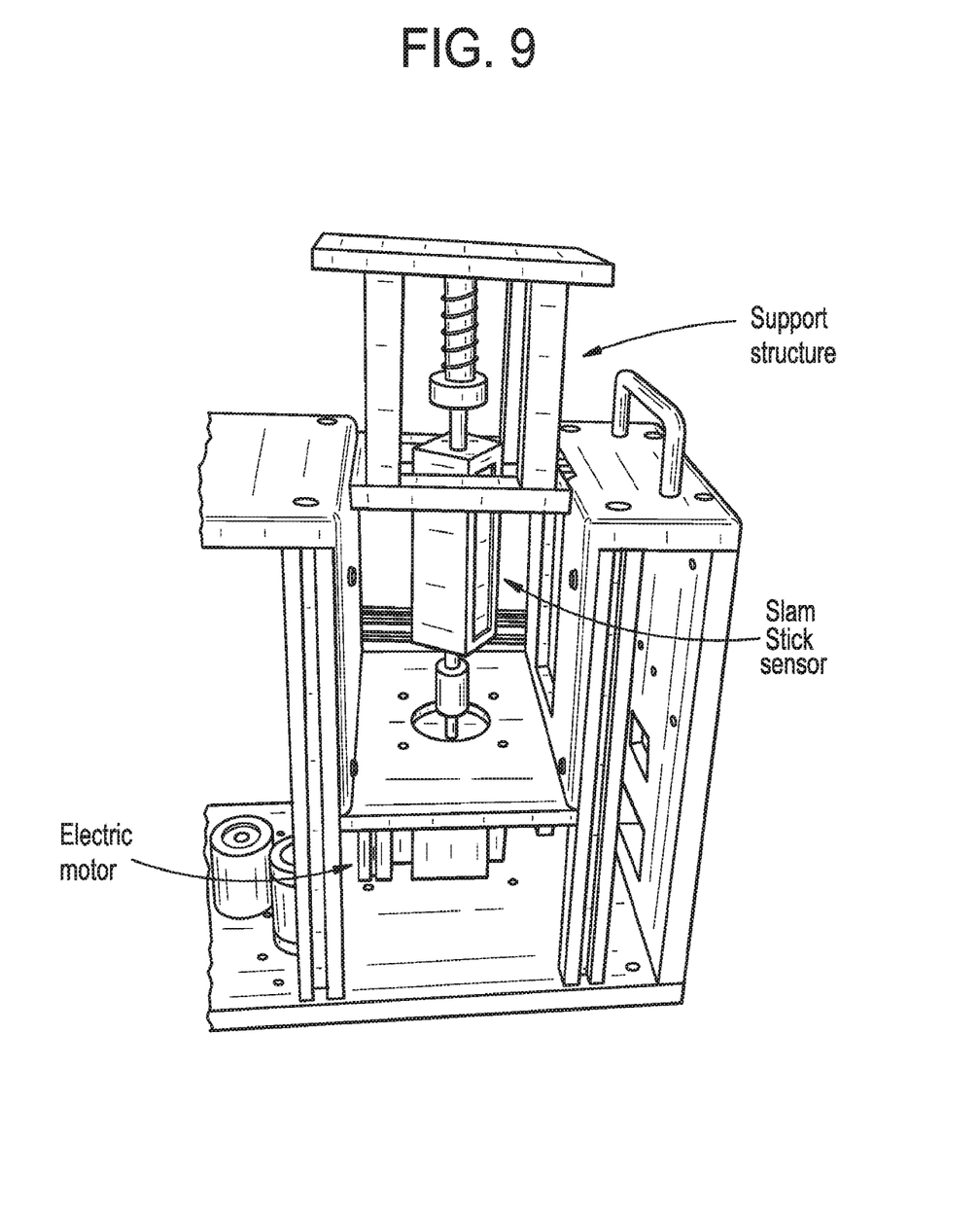
FIG. 9 is an image of a sensor experimental setup.

An experimental setup shown in the FIG. 9 was built. The setup consists of an electric motor connected to controller software on a laptop. The software and electric motor control the rotational velocity of the Slam Stick sensor as it spins about its vertical axis. The support structure maintains the sensors in position and minimizes the vibration as it is spinning around, limiting the noise in measurement. The Slam Stick sensor is secured into the structure by friction using a tight fitting custom adapter. The Slam Stick sensor was rotated at different rotational velocities while the sensor recorded acceleration and rotational information on to its internal memory. Sensor readings were taken at 14 different rotational speeds: 0, 100, 200, 300, 500, 1000, 1300, 1500, 1800, 2000, 2200, 2500, 3000 and 3500 RPM.

The gyroscope measured rotational speeds up to 333 RPM. The range of the gyroscope allowed for a direct comparison between the set rotational speed of the electric motor and the readings from the sensor. Table 2 below shows the percentage variation between the set RPM and what was measured by the gyroscope.

TABLE 2

Comparison between set RPM and sensor measurement

| Set RPM | Measure RPM - Gyroscope | % Variation* |
|---|---|---|
| 100 | 98.8 | 1.20% |
| 200 | 197.6 | 1.20% |
| 300 | 296.3 | 1.23% |

*% variation is calculated by dividing the difference between set RPM and measured RPM, and then dividing by the set RPM As can be seen from Table 2, the differences between set RPM and measured RPM are less than 1.3% of the set rotational speed. Data collected at 200, 1300, 2000 and 3000

RPM was excluded from the initial model testing and would be used to test the model performance. From equation 2, we expect centripetal acceleration to vary linearly with the square of the angular velocity. A linear regression model was applied to the data in order to determine the radius of rotation. The output of the linear regression was expected to be in this format.

$$y = kx + c \qquad (2)$$

Where x is the independent variable, which in this case is $\omega^2$, and y is the dependent variable, which in this case is the measured centripetal acceleration, k and c are calculated by the regression model and represent the radius of rotation and offset of the accelerometer respectively.

Figure 10:
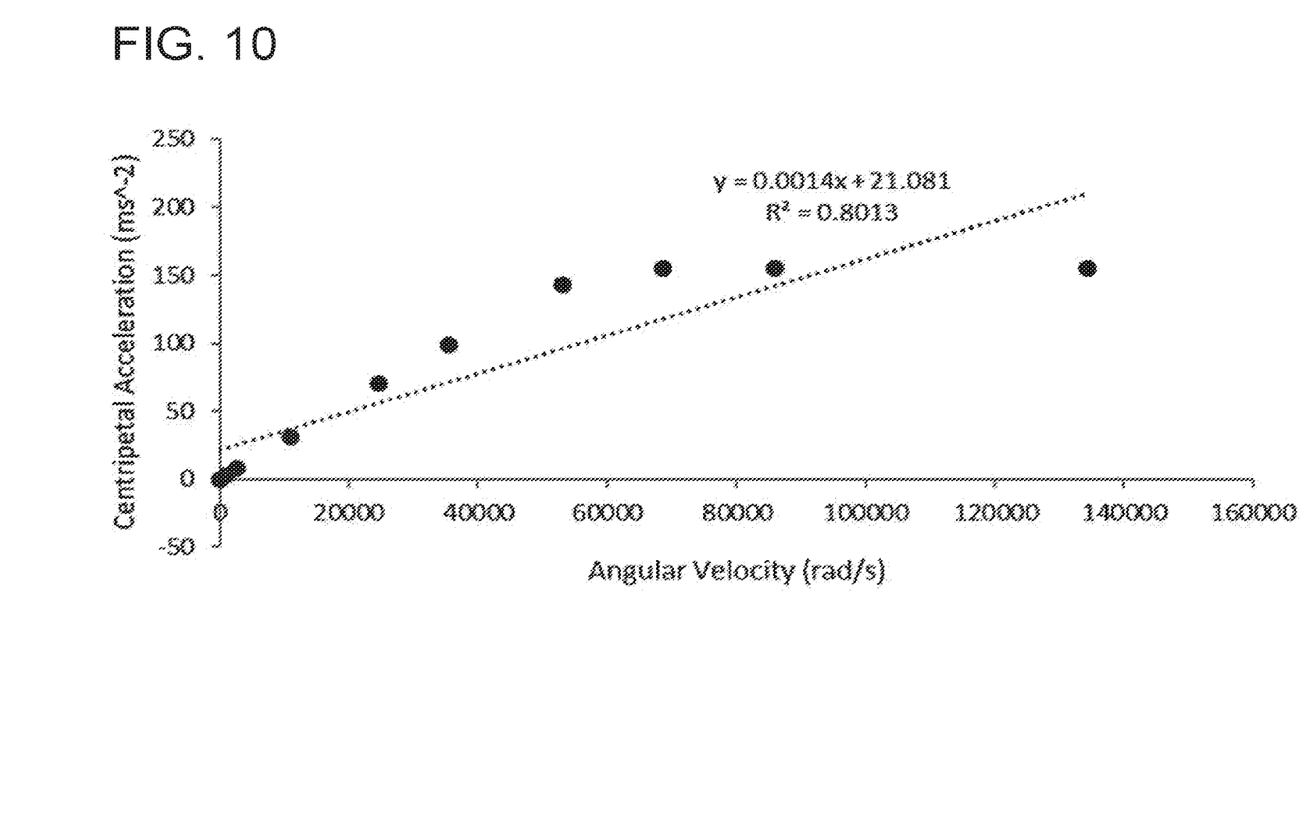
FIG. 10 is a graph of experimental results with linear regression fit.

FIG. 10 shows the initial results from the line regression model. The dots represent actual data and the linear regression fit line in also shown. Even though the $R^2$ value of 80% it is clear that the data does not follow a linear pattern, especially for high values of $\omega^2$. On further analysis of the data, it was discovered that experiments at 2,500 RPM and above exceeded the ±150 ms$^{-2}$ measurement range of the Slam Stick accelerometer.

Figure 11:
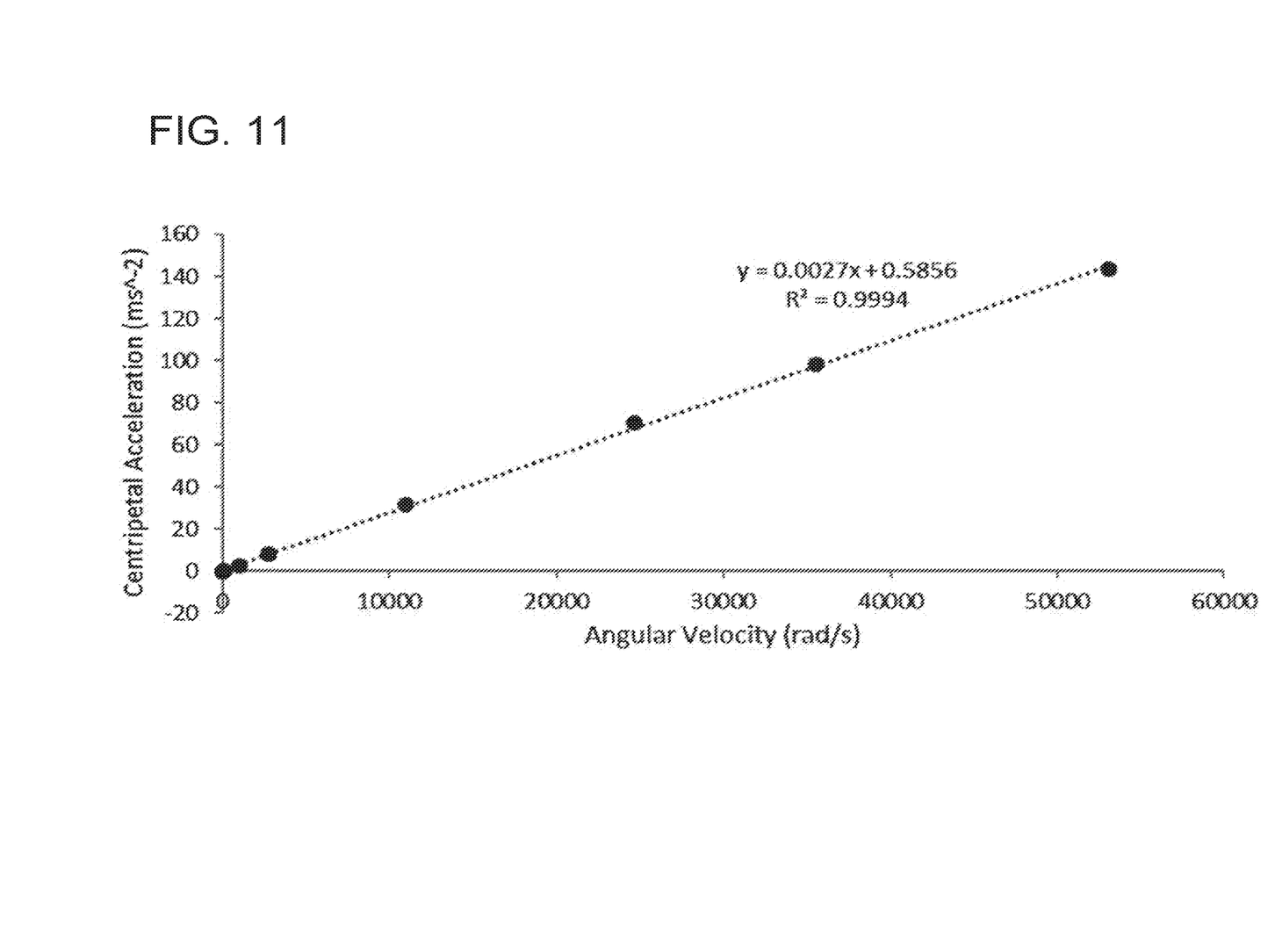
FIG. 11 is a graph of experimental results excluding speeds above 2,500 RPM with linear regression fit.

After removal of data involving rotational speeds at or above 2,500 RPM a linear regression model was applied to the remaining data. FIG. 11 below shows the results from that analysis:

The high $R^2$ of 99.94% shows that the model is fits the data well. From the model, it can be deduced that the accelerometer was 2.7 mm away from the center of rotation. The radius of rotation value seems reasonable, as it lies within the dimensions of the sensor (plane perpendicular to the axis of rotation 29.8 mm×15.0 mm).

In order to validate the performance of the model, it was tested on the three data points that were omitted from the model development. As mentioned earlier, data from 200, 1300, 2000 and 3000 RPM was separated from the rest of the data that was used in the model development for this very purpose. Unfortunately, at 3000 RPM, the centripetal acceleration exceeds the measurement range of the Slam Stick sensor that was used in the experiments. Table 3 below shows a summary of the results comparing electric motor set rotation velocities with those calculated by the model using accelerometer measurements.

TABLE 3

Performance of linear regression model

| Target RPM | Calculated RPM | Difference RPM | % Error* |
|---|---|---|---|
| 200 | 158.7 | −41.3 | −20.6% |
| 1300 | 1267.9 | −32.1 | −2.5% |
| 2000 | 1988.0 | −12.0 | −0.6% |

*Error is calculated by deducting the target rotational velocity from the rotational velocity calculated using the linear regression model.

The results in the table show that the model does not perform well at lower rotational velocities when the percentage error is 20.6%. However, at higher rotational velocities, where the chance of causing damage to the product is higher, the model is very accurate with a percentage error of only 0.6%. The high error level at lower rotational speeds most likely stems from the noise in the experiment system. Even though measures were taken to reduce vibration, the test apparatus still had some vibration.

These experiments demonstrate the feasibility of using accelerometers in embedded sensors to measure rotational velocity. A Slam Stick sensor used in the experiments provided an accurate rotational velocity at high speeds. The Slam Stick sensor is already configurable, with higher range accelerometers up to ±5000 ms$^{-2}$ which would be able to measure up to 12,000 RPM. 12,000 RPM is higher than the maximum expected upper range of 4,000 RPM in automated visual inspection machines.

Both the foregoing general description and the following detailed description are exemplary and explanatory only and are not restrictive. The use of the singular includes the plural unless specifically stated otherwise. The use of "or" means "and/or" unless stated otherwise. The use of the term "including", as well as other forms, such as "includes" and "included," is not limiting. Terms such as "element" or "component" encompass both elements and components comprising one unit and elements and components that comprise more than one subunit unless specifically stated otherwise. The use of the term "portion" can include part of a moiety or the entire moiety. When a numerical range is mentioned, e.g., 1-5, all intervening values are explicitly included, such as 1, 2, 3, 4, and 5, as well as fractions thereof, such as 1.5, 2.2, 3.4, and 4.1.

"About" or "~" means, when modifying a quantity (e.g., "about" 3 mM), that variation around the modified quantity can occur. These variations can occur by a variety of means, such as typical measuring and handling procedures, inadvertent errors, ingredient purity, and the like.

"Comprising" and "comprises" are intended to mean that methods include the listed elements but do not exclude other unlisted elements. The terms "consisting essentially of" and "consists essentially of," when used in the disclosed methods include the listed elements, exclude unlisted elements that alter the basic nature of the method, but do not exclude other unlisted elements. The terms "consisting of" and "consists of" when used to define methods exclude substantial method steps. Embodiments defined by each of these transition terms are within the scope of this disclosure.

"Coupled" means associated directly as well as indirectly. For example, a device or process can be directly associated with another device or process, or these devices and/or processes can be indirectly associated with each other, e.g., via another device or process.

What is claimed:

1. A sensor for monitoring stress on a product, wherein the sensor is embedded into a housing for a container and comprises a micro-electro-mechanical system (MEMS), wherein the MEMS is an accelerometer that measures rotational and translational accelerations in all three dimensions.

2. The sensor of claim 1, wherein the container is a container for a protein.

3. The sensor of claim 1, wherein the container is a vial or syringe.

4. The sensor of claim 2, wherein the protein is an antibody or an antibody fragment.

5. A method of monitoring the stress profile of a product, comprising utilizing the sensor of claim 1 during an automated visual inspection process.

6. The method of claim 5, wherein the stress profile comprises the acceleration or velocity of the product.

* * * * *